3,117,995
**METHOD OF PREPARING p-NITROACETO-
PHENONE AND ITS OXIME**
Balogh Anton, Kovendi Alexandru, Rotaru Dumitru, and
Craciunescu Elena, all of Cluj, Rumania, assignors to
The Rumanian Ministry for Petroleum and Chemical
Industry
No Drawing. Filed Feb. 11, 1960, Ser. No. 7,988
3 Claims. (Cl. 260—566)

The present invention covers a method of preparing para-nitroacetophenone oxime, starting from mixtures of nitroethylbenzene isomers.

In prior art processes, the direct preparation of nitro-acetophenone-oximes is accomplished by using as starting material ortho or para isomers of nitro-ethylbenzene.

The ortho or para isomer of an alkyl-nitrobenzene is isonitrozed with an alkyl-nitrite, in an absolutely anhydrous medium, in the presence of either sodium ethylate or KOH, the reaction medium consisting of anhydrous aliphatic alcohols.

The drawbacks of such techniques are the necessity of using an anhydrous alcohol and of separating ortho and para isomers of nitro-ethylbenzene, which involves the use of complicated apparatus, owing to the close values of the boiling-points of those isomers.

The present invention covers a method of preparing para-nitroacetophenone oxime by using as starting material mixtures of nitroethylbenzene isomers, such as they are obtained after nitration (see MiKondo, S. Uyeol, Ber. 70, 1991 (1937)). The process may be performed in two versions avoiding the above mentioned drawbacks.

(a) The first version of the method according to the invention involves the preparation of p-nitroacetophenone oxime by the direct use of a mixture of ortho and para nitroethylbenzene, which is subjected to oximation by alkylnitrites in excess, in a medium consisting of 95% alcohol, in the presence of an alkaline hydroxide in excess, or of an alcoholate in absolute alcohol. It has now been ascertained that, under such conditions, the oximation speeds of ortho and para isomers differ widely, the latter reacting almost completely and the former far less.

After the iso-nitrozation or oximation, the separation of para-nitroacetophenone-oxime out of the mixture may be accomplished by one of the following two techniques:

The alcohol may be removed by distillation, in which case ortho and para-oximes are precipitated in the aqueous residue extract by subsequent treatment with a diluted acid, out of which they are separated by crystallization.

Without removing the alcohol, para-oxime may be precipitated alone out of the water-diluted and cooled mixture, by treatment with a diluted acid.

The resulting oximes are hydrolyzed to nitro-acetophenone proper by known methods or by the technique mentioned under (b).

(b) The second version involves iso-nitrozation of nitroethylbenzene by known methods or by the technique mentioned under (a), thus obtaining the corresponding ortho and para-oximes mixture.

It has now been ascertained that the ortho and para-oximes mixture may be subjected to selective hydrolysis so as to obtain separately the ortho and para-nitroacetophenone, owing to their very different hydrolysis speeds.

This selective hydrolysis is performed using acids of proper concentration and at convenient temperatures. We have found that the hydrolysis proceeds particularly advantageously if hydrochloric acid of about 23–30% is used at a temperature of about 30–50° C. In a preferred embodiment, 26% hydrochloric acid at 37–40° C. is employed. Under such conditions the para-isomer is transformed to para-nitroacetophenone, whereas the ortho-isomer remains unchanged, being readily separated and isolated as such, or hydrolyzed to ortho-acetophenone by known techniques.

Three examples of application of the invention are given below.

First example: Into a 6 l. flask, fitted with mechanical stirring, a thermometer and a cooler, 2100 ml. of 95% alcohol and 260 g. of sodium hydroxide are introduced and heated for an hour to 75–80° C. The solution is then cooled and a mixture of 710 g. of mono-nitroethyl-benzene containing about 40 to 45% of para-isomer (the balance being ortho-isomer) and 400 g. of butylnitrite is added all at once under slow stirring. The temperature is held at 40° C. for nearly 16 hours, then 2 l. of water are added and the alcohol is distilled under vacuum so as to maintain the temperature at a maximum of 50° C. The residue is treated with about 1 l. of gasoline which extracts the non-transformed mononitroethylbenzene. Out of the resulting aqueous layer ortho and para-oximes are precipitated with diluted hydrochloric acid, at a temperature below 25° C. The precipitate is then filtered and washed.

A mixture of about 300 g. of para and ortho-nitroacetophenone-oxime, containing 85 to 92% para-isomer is thus obtained. Recrystallization in diluted alcohol yields 85 to 92% para-nitroacetophenone, oxime M.P. 169 to 171° C., with respect to p-nitro-ethylbenzene used, the balance being mostly o-nitroethylbenzene.

Second example: 10,400 kg. of sodium hydroxide are dissolved in 84 l. of hot ethyl alcohol to 95%. The solution is cooled to 30° C. and a mixture of 27 kg. mononitro-ethylbenzene with about 40 to 45% para-isomer (the balance being ortho-isomer) and 18 kg. of butylnitrite is added. The whole is maintained at 34 to 38° C. while stirring, for 14 hr., then 100 l. of water are added. Non-reacted nitro-ethylbenzene is then extracted with gasoline.

The isomer-mixture is poured over 50 kg. of ice and hydrochloric acid, d=1.09, is added to precipitate the para-isomer in the oximes mixture. After filtering, rinsing with water, water-vapour distillation and renewed filtering, 9.5 to 10 kg. of para-nitroacetophenone-oxime, M.P. 168–171° C., are obtained.

Third example: Into a 3 l. flask, fitted with a stirring device and a thermometer, and containing 300 g. of oximes-mixture prepared according to Example 1, 1500 ml. of hydrochloric acid to 26% are added. The mixture is stirred at 37 to 40° C. for 4 to 5 hr.; para-nitroacetophenone-oxime is transformed to para-nitroacetophenone, and the ortho-isomer is dissolved as such. The mixture is then filtered, and the precipitate is rinsed first with hydrochloric acid of the same concentration and then with water, yielding 250 to 260 g. of para-nitroacetophenone, M.P. 78–80° C. By re-crystallization in carbon tetrachloride a product with a M.P. of 80–81° is obtained. Hydrolysis of para-nitroacetophenone-oxime is almost quantitative. Ortho-oxime remains in the acid solution, out of which it may be precipitated with water and extracted with a solvent.

The above examples may be varied by using another alcohol, for instance butanol, a different condensation reagent, for instance sodium or potassium alcoholate, or alkaline hydroxides, and other nitrites, for instance amylic nitrite, without decreasing the selectivity, in each case using the proper amounts of components. The selective hydrolysis of the oximes-isomers mixture may be likewise performed with the aid of other acids, for instance sulphuric acid, at other concentrations and at convenient temperatures.

The application of the present invention ensures the following advantages:

The tedious fractionation of alkyl-nitrobenzene is avoided;

The use of absolute alcohol is also avoided, and NaOH is more readily dissolved by the alcohol of about 95% used;

The process may be more easily controlled, since sodium iso-nitrosate is soluble in alcohol of about 95%.

We claim:

1. In the process of oximizing nitroethylbenzene in which nitroethylbenzene is reacted with an alkyl nitrite in the presence of an alkali metal alcoholate and absolute ethyl alcohol, the improvement which consists in reacting
   (1) a mixture of the ortho and para-nitroethyl benzenes in the approximate proportions as they are formed when nitrating ethylbenzene,
   (2) an alkyl nitrite chosen from the group butylnitrite, amylnitrite, and
   (3) a member of the group alkali metal hydroxide, alkali metal alcoholate, said alkali metal in turn being chosen from the group sodium, potassium,
      such reaction being conducted in the presence of 95% ethyl alcohol in the temperature range 30–40° C., and favoring the reaction of para-nitroethylbenzene rather than that of the ortho-nitroethylbenzene, thereafter separating the formed para-nitroacetophenone oxime from the corresponding ortho-compound and other components of the completed reaction mixture.

2. In a process as claimed in claim 1, wherein the p-nitroacetophenone oxime is separated from the o-nitroacetophenone oxime by admixing dilute hydrochloric acid with the reaction mixture.

3. The process of making para-nitroacetophenone by first making a mixture of ortho and para oxime compounds threof as set forth in claim 1, then treating said mixture with hydrochloric acid of about 23–30% concentration at a temperature of 30–50° C. until substantially all the para-nitroacetophenone oxime compound is hydrolyzed to para-nitroacetophenone to the substantial exclusion of the corresponding ortho compound.

References Cited in the file of this patent

FOREIGN PATENTS

| 13,979 of 1899 | Great Britain | May 5, 1900 |
| 107,095 | Germany | Sept. 2, 1898 |
| 109,663 | Germany | Dec. 16, 1898 |
| 515,304 | Italy | Feb. 14, 1955 |
| 1,006,415 | Germany | Apr. 18, 1957 |

OTHER REFERENCES

Ford-Moore et al.: J. Chem. Soc. (London), 1946, pp. 679–81.

Dickinson et al.: J. Chem. Soc. (London), volume of 1959, pp. 3036, 3040 QD 1c6.